United States Patent [19]
Murphy

[11] Patent Number: 6,019,302
[45] Date of Patent: Feb. 1, 2000

[54] METHOD AND APPARATUS FOR INDICATING END OF USEFUL LIFE FOR TAPE CARTRIDGES

[75] Inventor: Brian Francis Murphy, Austin, Tex.

[73] Assignee: International Business Machines Corp., Armonk, N.Y.

[21] Appl. No.: 09/168,588

[22] Filed: Oct. 8, 1998

[51] Int. Cl.[7] .......................... G11B 23/087; G11B 23/02; G11B 5/78
[52] U.S. Cl. ........................... 242/344; 360/132; 360/134
[58] Field of Search ..................................... 242/344, 348, 242/335; 360/132, 134

[56] References Cited

U.S. PATENT DOCUMENTS 4,978,985  12/1990  Smart et al. ......................... 242/348 X
5,049,912   9/1991  Pagano et al. ....................... 242/348 X

*Primary Examiner*—John Q. Nguyen
*Attorney, Agent, or Firm*—Leslie Van Leeuwen; Andrea Pair Bryant; Hughes & Luce, L.L.P.

[57] ABSTRACT

Apparatus and a method are provided for easily, visually indicating to a user that a tape cartridge has reached the end of its useful life by causing a flag, wound beneath a tape inside the cartridge, to appear within a clear window in the cartridge housing. When a tape drive in which the cartridge is mounted detects a defect in a data tape, the tape is rewound and extra torque is applied thereto to expose the flag. When a cleaning tape reaches its end, the flag is released.

15 Claims, 3 Drawing Sheets

METHOD AND APPARATUS FOR INDICATING END OF USEFUL LIFE FOR TAPE CARTRIDGES

TECHNICAL FIELD

The present invention relates to magnetic tape cartridges. More specifically, it relates to providing a physical, visual indicator to users when the end of useful life of the cartridge has been reached.

BACKGROUND OF THE INVENTION

Various sizes of magnetic tape cartridges are readily available from many sources for use in computer systems. Tape drives compatible with cartridge size and format are available for utilizing tape cartridges for data storage, backup and drive cleaning operations. Such drives usually include mechanisms for electronically noting and recording tape condition and/or defects. Access to and interpretation of drive data is not readily available to the user.

A situation often occurs, however, that involves attempted reuse of a cartridge by a user subsequent to an unsuccessful or failed use. This situation arises because there is no way other than manually marking a failed or defective cartridge that enables a user to detect from the state and physical appearance of the cartridge that reuse should not occur. The result is detrimental in that user systems experience a loss of precious time due to the need to repeat operations which have run unsuccessfully or terminated abnormally.

Similarly, cartridge makers often provide a log label on which users should mark each use. Completion of the log entries thereby indicates that useful life has expired. However, this technique is unreliable since it is wholly dependent on diligent attention to procedure by human operators. The result is as above described when an attempt is made to again use a bad or expired cartridge.

Therefore it is desirable to have a more fool proof way to easily and immediately identify tape cartridges with fatal defects or which have otherwise reached the end of their useful lives.

BRIEF SUMMARY OF THE INVENTION

The present invention solves the problem identified in the prior art by providing an indicator flag which is visible by a user and actuated by cooperative interaction between a tape cartridge and the tape drive. A flag is attached to the hub of the take-up spool in a data cartridge and covered by the tape until such time as the tape drive logic determines the end of useful life has been reached. At that time, tape drive logic causes a predetermined rewind sequence which allows the flag to become visible through the cartridge housing.

In a similar manner, a cleaning tape cartridge is provided with a flag on the supply spool which is covered by the cleaning tape until such time as the end of tape is reached and the flag becomes visible through a clear window in the cartridge housing.

It should be noted that implementing the present invention in no way affects normal tape drive operation or normal tape use. Presence of the flag of the present invention is transparent to a tape drive system.

BRIEF DESCRIPTION OF THE DRAWINGS

The above and other features and advantages of the present invention will become apparent from the following detailed description of a preferred embodiment taken in conjunction with the various figures of the drawing wherein.

DETAILED DESCRIPTION OF THE PREFERRED EMBODIMENT

Figure 1:
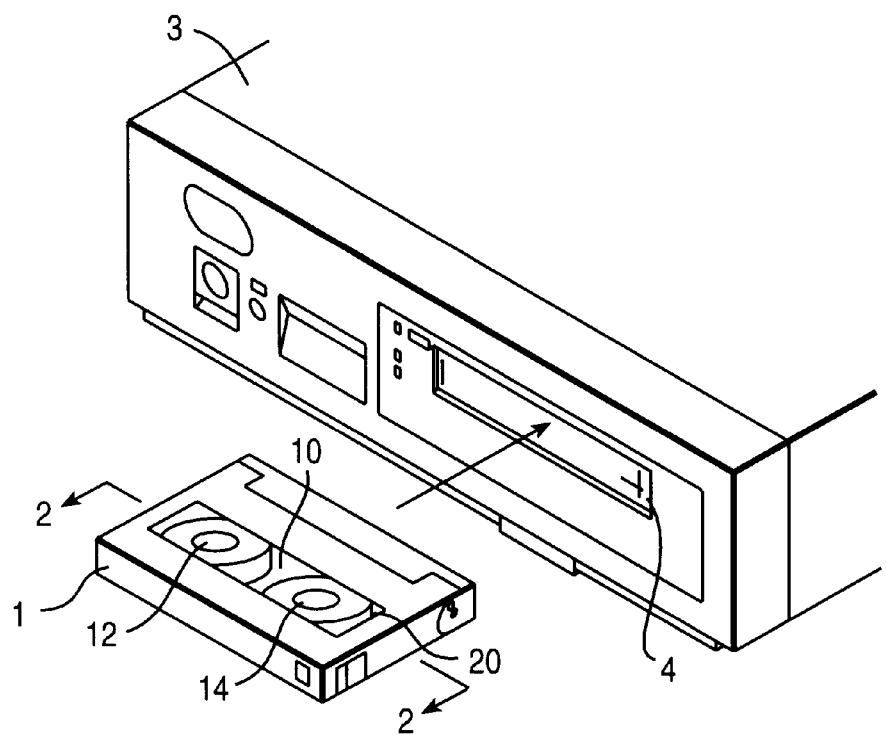
FIG. 1 is a perspective view of a tape cartridge and a tape drive.

Refer now to FIG. 1 which schematically shows tape cartridge housing 1. Tape cartridge housing 1 represents a generic cartridge. Variations in detail exist in specific cartridges due to manufacturer design choices and because of the size and type of tape enclosed therein. Further differences in structure proceed from the design of mechanisms provided to allow operable engagement between tape in tape cartridge 1 and a particular tape drive, indicated generally at 3. For example, there are what are known as QIC, for quarter inch cartridge, cartridges and associated tape drives. Other standard tape cartridges and drives in which the present invention finds utility include 4 mm and 8 mm tape cartridges. As is well understood, cartridge 1 is adapted to placed in an opening 4 in tape drive 3 housing to be drivingly engaged therein.

Figure 2:
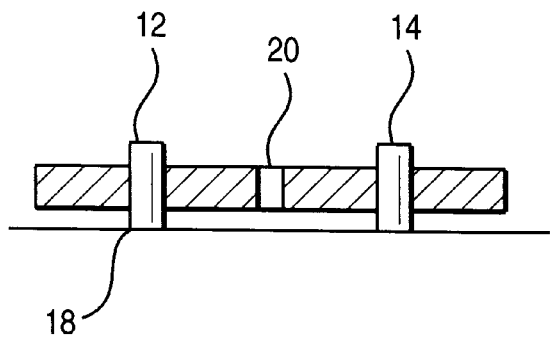
FIG. 2 is a cross sectional view of cartridge 10 taken along arrow 2—2.

Tape cartridge 1 includes a clear window 10 in one face of its housing which permits a user to observe supply and take-up reels 12 and 14, respectively. Refer now to FIG. 2. An indicator flag 18 in accordance with the invention is attached to either reel 12 or 14 during manufacture. Supply reel 12 is used for a cleaner tape cartridge and take-up reel 14 is used for a data tape cartridge.

Flag 18 is made from a non conducting material such as MYLAR™ and is no wider than 1 to 2 times the width of tape 20 in cartridge 1. Flag 18 material is resilient, being able to be held beneath tape wound thereover for indefinite periods of time and yet spring out to render flag 18 visible once no longer covered by tape 20.

Figure 3:
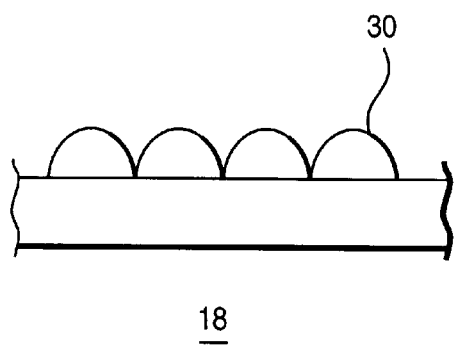
FIG. 3 is a plan view of a flag in unfolded and folded configurations prior to attachment within a tape cartridge.
Figure 3:
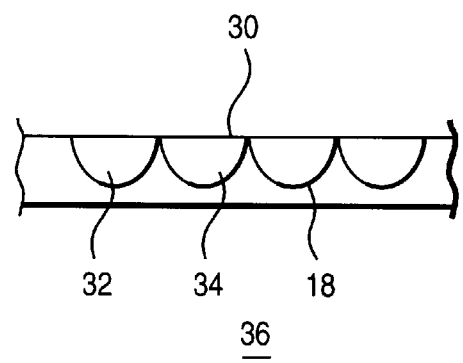

FIG. 3 illustrates a flag 18 blank prior to attachment. Flag 18 is constructed so that it is foldable along line 30 so that its width does not exceed that of tape 20 which will be wound thereover. When folded along line 30, flaps 32, 34, 36 lie flat against the rest of flag 18. Flaps 32, 34, 36 are preferably rounded as that shape is more easily visually noticeable. A bright color such as red for the material of at least flaps 32, 34, 36 is desirable since currently available tape cartridge housings have a color providing contrast. Obviously any color which provides sufficient contrast with the color of cartridge housing 1 may be chosen.

Figure 4:
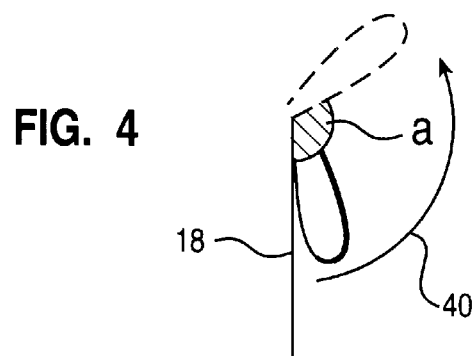
FIG. 4 illustrates the change in flag position when exposed.

When exposed due to the release of pressure imposed by tape 20, flaps 32, 34, 36 spring upwardly in the direction of arrow 40 as shown in FIG. 4, leaving an angle A greater than 90 degrees between the flaps 32, 34, 36 and the surface of the flap material wound on, attached to a reel hub. FIG. 4 illustrates either of reels 12 and 14. For convenience, reel 14 is shown in the figure. When tape 20 has been rewound onto reel 12, flag 18 is uncovered and a flap 32, one shown, rises and becomes visible through window 10, FIG. 1.

Figure 5A:
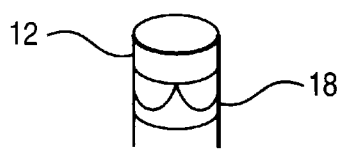
FIG. 5A shows a flag attached to a cartridge spool.
Figure 5B:
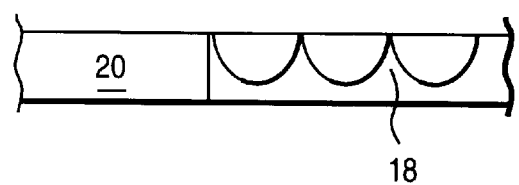
FIG. 5B shows a flag attached to a tape leader.

FIG. 5A shows reel 12, for illustrative purposes only, with a flag 18 in accordance with the invention attached thereto. Since reel 12 is shown in FIG. 1 to be a supply reel, FIG. 5A applies to a cleaner tape cartridge. Flag 18 in FIG. 5A becomes visible through window 10 when tape 20 in a cleaner cartridge has been fully advanced, thereby releasing the pressure exerted by reeled tape on the flag. FIG. 5B illustrates a tape 20 having a flag blank attached to its leading edge. In this illustration, tape 20 is assumed to be a data tape. A data tape cartridge is rewound when a defect is detected by the tape drive. This is standard practice. In accordance with the present invention, additional torque in the rewind direction is applied to release the pressure exerted on the flag by the tape.

Figure 6:
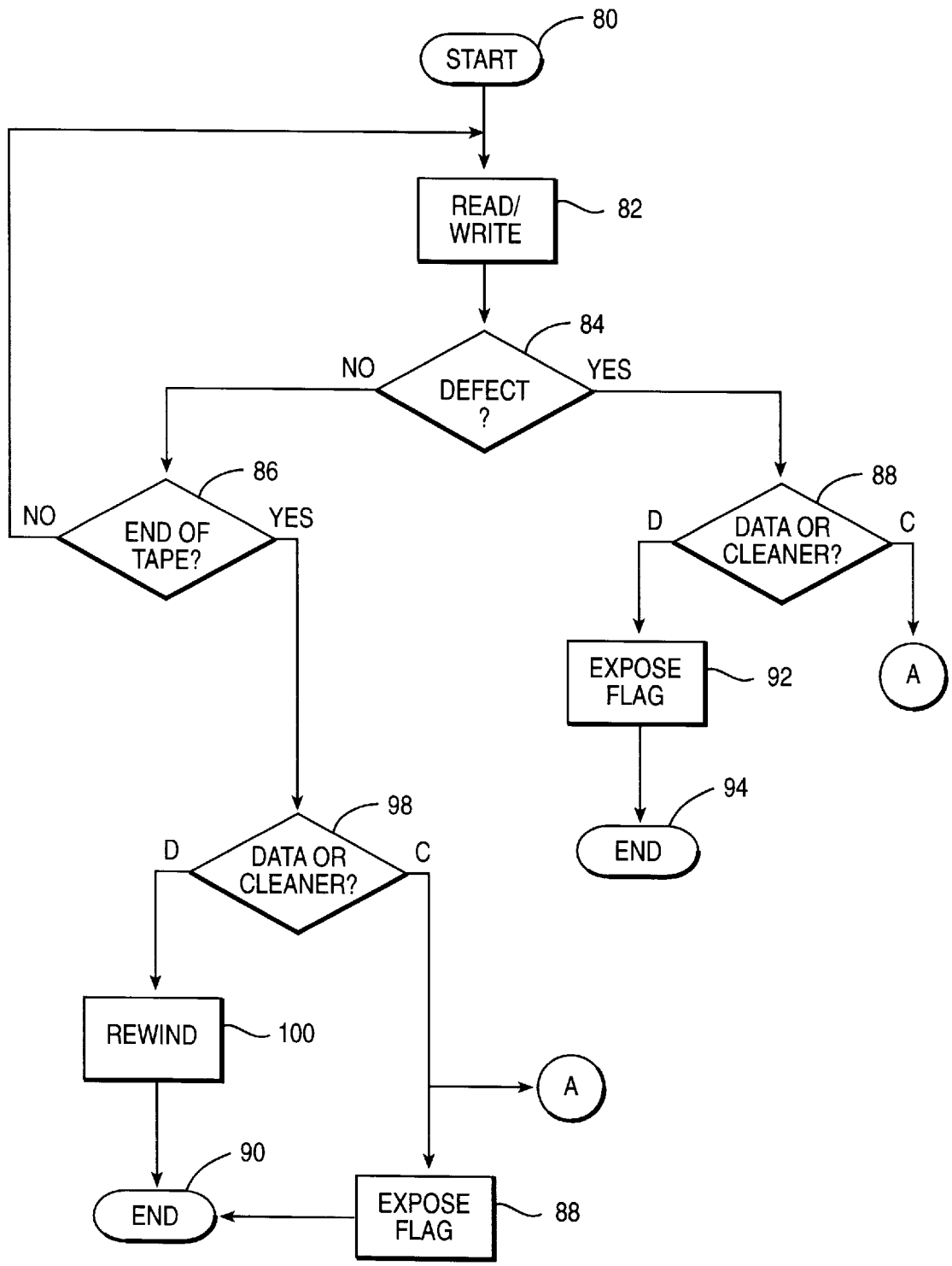
FIG. 6 illustrates the logic followed in a tape drive embodying the present invention.

Refer now to FIG. 6 which shows the additional logic to be executed by a tape drive including the present invention. The logic is entered at terminal 80 and tape in a cartridge is read or written at step 82. Normal operation continues until a defect or error condition is found. In addition to the error logging of standard practice, tape drive logic then branches at step 84 to decision block 86 to determine whether a data or cleaner tape is involved. If the tape is a cleaner tape, the logic branches to step 88 where the flag is caused to be exposed by the logic dictating that the tape be fully forwarded. Control terminates at terminal 90.

If at decision block 86 a data tape was found, then control passes to step 92 at which the exposure sequence for data tapes misrepresented. The logic causes the tape to be totally rewound and then causes additional torque to be applied in the direction of rewind to thereby expose the flag. Thereafter the logic terminates at terminal 94.

Returning to step 84, as earlier described, if no error occurs, the logic then checks at test 96 whether the end of tape has been reached. If not, normal operation of the tape drive continues at step 82.

If end of tape has been reached, then at test 98 the logic branches as a function of whether the tape is a data or cleaner tape. If the tape is a data tape, a standard rewind sequence occurs as indicated at step 100 before a normal termination at terminal 90. If the tape is in a cleaner cartridge, then at step 88 the flag is exposed by fully forwarding the tape prior to terminating operation at terminal 90.

In another embodiment of the invention the flag is attached to the supply reel for both data and cleaner tape cartridges. In this embodiment the exposure sequence executed upon detection of an error or defect condition is the same for either type of cartridge. The exposure sequence for either type cartridge is that described above with regard to a cleaner cartridge; the tape is fully advanced to thereby expose the flag. Those skilled in the art will appreciate that the flag may be directly attached to the hub of the supply reel or be made integral with the trailing end of the tape.

Still another modification which may be made without departing from the basic aspect of the present invention, the provision of a flag which is made visually detectable to a user upon the occurrence of certain errors or defects found in the tape in a tape cartridge, is to apply the teachings of the present invention to those cartridges which contain only a single reel of tape. Tape drives utilizing such cartridges may be provided with appropriate control logic to cause exposure of a flag attached to the hub of the single reel. Such logic as is above described in connection with cleaner tapes is suitable for this modification in that the flag is actuated by advancing the tape completely to thereby release the flag. In this single reel cartridge embodiment the cartridge reel is always a supply reel. Once a defect has been detected and the tape is completely forwarded to release the flag, the tape is rewound back into the single reel cartridge. Since, as described in connection with FIG. 4, the flaps when released form an angle greater than 90 degrees, there is no interference therewith during tape rewind.

Thus, the present invention provides a simple method and apparatus for substantially fail safe visual indication to a human user when either a data or cleaning tape cartridge has reached then end of its useful life.

While the invention has been shown and described with reference to a particular embodiment and modifications thereof, it will be understood by those skilled in the art that the foregoing and other changes in form and detail may be made therein without departing from the spirit and scope of the invention.

I claim:

1. Apparatus for enabling indication to a user of the end of useful life of a tape cartridge for a tape drive, said cartridge including supply and take-up spools and a window through which said spools are visible, comprising:
   (a) a flag attached during manufacture of said cartridge to a hub of one of said spools, said flag being held beneath a tape wound on said one of said spools;
   (b) means operable in said tape drive for detecting conditions of said tape therein, including defects and end of tape; and
   (c) means responsive to said means for detecting for initiating a flag exposure sequence.

2. The apparatus of claim 1, wherein said means for detecting additionally includes means for determining whether a tape is a data or cleaner tape.

3. The apparatus of claim 2, wherein for a data tape:
   said flag is attached to said take-up spool of said cartridge; and
   said flag exposure sequence includes means for rewinding said tape and performing a super rewind to thereby expose said flag.

4. The apparatus of claim 2, wherein for a cleaner tape:
   said flag is attached to said supply spool of said cartridge; and
   said flag exposure sequence includes means for fully advancing said tape to thereby expose said flag.

5. The apparatus of claim 1, wherein said flag is located on said take-up spool of a data tape.

6. The apparatus of claim 1, wherein said flag is located on said supply spool of a cleaner tape.

7. A method of enabling indication to a user of end of useful life of a tape cartridge in a tape drive, said cartridge including supply and take-up spools and a window through which said spools are visible, comprising the steps of:

attaching during manufacture of said cartridge a flag to a hub of one of said spools, said flag being held beneath a tape wound on said one of said spools;

detecting conditions of said tape in said cartridge, said conditions including tape type, a plurality of defects and end-of-tape; and selectively initiating in response to said detecting step a flag exposure sequence.

8. The method of claim 7 wherein said attaching step includes:

attaching said flag to said take-up spool of a data tape cartridge; and attaching said flag to said supply spool of a cleaner tape cartridge.

9. The method of claim 8 wherein said initiating step includes:

selecting a flag exposure sequence appropriate to tape type.

10. The method of claim 9 wherein for a data tape said selecting step results in:

rewinding said tape; and subsequently performing a super rewind.

11. The method of claim 9 wherein for a cleaner tape said selecting step results in:

fully advancing said tape.

12. A method for indicating cartridge usability status to a user of a tape cartridge comprising the steps of:

providing a visually perceptible flag adjacent one reel of the cartridge; and exposing said flag upon detection of an end of cartridge useful life condition; wherein said providing step includes attaching said flag to the leading end of a data tape and attaching said flag to the trailing end of a cleaner tape.

13. The method of claim 12 wherein said providing step includes:

attaching a flag directly to said reel of said cartridge.

14. The method of claim 12 wherein said exposing step includes for a data tape cartridge:

after rewinding the tape, applying additional rewinding torque to the data cartridge.

15. The method of claim 12 wherein said exposing step includes for a cleaner tape cartridge:

fully advancing the tape.

* * * * *